US008434319B2

(12) United States Patent
Klier et al.

(10) Patent No.: US 8,434,319 B2
(45) Date of Patent: May 7, 2013

(54) APPARATUS FOR DISPENSING MADE-TO-ORDER FROZEN BEVERAGE

(75) Inventors: Niri Klier, Savyon (IL); Boaz Granot, Tel Aviv (IL)

(73) Assignee: Nicevend Ltd., Neve Yarak (IL)

( * ) Notice: Subject to any disclaimer, the term of this patent is extended or adjusted under 35 U.S.C. 154(b) by 661 days.

(21) Appl. No.: 12/689,287

(22) Filed: Jan. 19, 2010

(65) Prior Publication Data

US 2010/0151083 A1 Jun. 17, 2010

Related U.S. Application Data

(63) Continuation-in-part of application No. 11/849,388, filed on Sep. 4, 2007, now abandoned.

(60) Provisional application No. 61/164,488, filed on Mar. 30, 2009, provisional application No. 61/145,660, filed on Jan. 19, 2009.

(51) Int. Cl.
*A23G 9/00* (2006.01)
*F25C 5/18* (2006.01)
*C12C 5/02* (2006.01)

(52) U.S. Cl.
USPC ............ 62/342; 62/1; 62/344; 62/381; 222/1; 222/132; 426/66

(58) Field of Classification Search ................. 62/1, 68, 62/342; 222/1, 132, 146.6, 148
See application file for complete search history.

(56) References Cited

U.S. PATENT DOCUMENTS

| 3,156,103 A | * | 11/1964 | Ross ............................... 62/331 |
| 3,702,666 A | * | 11/1972 | Santo .......................... 222/129.4 |
| 3,729,177 A | * | 4/1973 | Keyes et al. ................... 366/138 |
| 4,528,824 A | * | 7/1985 | Herbert .......................... 62/331 |
| 4,653,281 A | * | 3/1987 | Van Der Veer .................... 62/71 |
| 5,005,364 A | | 4/1991 | Nelson |
| 5,219,008 A | | 6/1993 | Shannon |
| 5,344,234 A | * | 9/1994 | Caveza ......................... 366/192 |
| 5,706,661 A | | 1/1998 | Frank |
| 5,950,866 A | | 9/1999 | Lancaster |
| 5,960,701 A | * | 10/1999 | Reese et al. ...................... 99/275 |
| 6,082,120 A | * | 7/2000 | Hoffmann et al. ................ 62/68 |
| 6,301,908 B1 | * | 10/2001 | Huffman et al. ................ 62/137 |
| 6,460,580 B1 | * | 10/2002 | Cunha et al. ................... 141/196 |
| 6,474,862 B2 | | 11/2002 | Farrell |
| 6,863,916 B2 | * | 3/2005 | Henriksen et al. ............ 426/524 |
| 7,278,275 B2 | | 10/2007 | Voglewede |
| 7,528,824 B2 | | 5/2009 | Kong |

(Continued)

FOREIGN PATENT DOCUMENTS

JP 2003303371 10/2003

*Primary Examiner* — Frantz Jules
*Assistant Examiner* — Joseph Trpisovsky
(74) *Attorney, Agent, or Firm* — Mark M. Friedman

(57) ABSTRACT

An apparatus for preparing and dispensing a flavored ice beverage and a method of using thereof. The apparatus includes at least one container for holding flavor ingredients, a blending unit including a blender container and a blending mechanism, an ice flakes supplying unit, a mechanism for transferring the flavor ingredients to the blender container and a computerized control unit for controlling one or more aspects of the process of producing the ice beverage. The flavor ingredients can be in grain form, powder form or in liquid form.

31 Claims, 7 Drawing Sheets

U.S. PATENT DOCUMENTS

| | | |
|---|---|---|
| 7,802,444 B2 | 9/2010 | Landers |
| 2002/0131324 A1* | 9/2002 | Farrell .......................... 366/147 |
| 2004/0226311 A1* | 11/2004 | Ishitomi et al. ................. 62/348 |
| 2005/0242120 A1* | 11/2005 | Sato et al. ................... 222/146.6 |
| 2006/0147601 A1 | 7/2006 | Scullion |
| 2006/0207270 A1* | 9/2006 | Voglewede et al. ............. 62/135 |
| 2007/0022763 A1 | 2/2007 | Moulder |
| 2007/0119867 A1* | 5/2007 | Nakato et al. ................. 222/222 |
| 2007/0193299 A1* | 8/2007 | Landers et al. ................. 62/390 |
| 2008/0066483 A1 | 3/2008 | Klier |
| 2010/0242497 A1* | 9/2010 | Bertone ............................. 62/1 |

\* cited by examiner

APPARATUS FOR DISPENSING MADE TO-ORDER FROZEN BEVERAGE

CROSS-REFERENCE TO RELATED APPLICATIONS

This application is a continuation in part of application Ser. No. 11/849,388, filed Sep. 4, 2007.

The present application also claims the benefit under 35 U.S.C. 119(e) of U.S. provisional application 61/164,488 filed on Mar. 30, 2009 and U.S. provisional application 61/145,660 filed on Jan. 19, 2009.

FIELD OF THE INVENTION

The present invention relates to the field of producing frozen drink-mixtures and more particularly, the present invention relates to a novel method and apparatus for producing a flavored ice beverage from ice flakes and a selected liquid portion of the ice beverage, whereas the ice flakes and the liquid portion are freshly mixed and dispensed.

BACKGROUND OF THE INVENTION AND PRIOR ART

The term "ice beverage", as used herein, refers to a beverage being in a slush state, that is a pourable mixture of ground ice and liquid, wherein the mixture is generally homogeneous. The quantity of liquid may also be nil. The ground ice is composed of ice particles or ice flakes. The terms "ice particles" and "ice flakes" are used herein interchangeably. The terms "blender" and "blending unit" are also used herein interchangeably.

A common prior art method for producing ice beverages, which can be continuously and instantaneously supplied, uses device having a liquid mixture which is chilled to a partial frozen state, while being continuously mixed. The disadvantage of the method is the short shelf-life of the mixture. Moreover, the process of preparing the ice beverage may involve manual control which has to be done by trained personal. The device may not operate automatically and may need continuous supervision when an ice beverage is requested. Furthermore, the process of cooling the liquid into a ready to serve ice beverage, typically takes between 20-60 minutes, during which time the ice beverage cannot be served.

Other prior art devices for dispensing ice beverages, such as vending machines, do not have the capacity needed to ensure a non-stop supply of a large numbers of servings by a single machine. Existing vending machines suffer from a short shelf life, due to the method operation. Moreover, the vending machines offer a limited variety of flavored ice beverages.

Prior art devices for dispensing flavored ice beverages do produce the flavored ice portion of the beverage and the liquid portion of the beverage with the same process, thereby the two portions of the beverage cannot be controlled to repeatably contain the same content and thereby producing an ice beverage which has substantially the same content and the same flavor.

Another prior art apparatus for dispensing flavored ice beverages, is described in PCT application WO 2008/032306, by Ehud Klier et al., the disclosure of which is incorporated by reference for all purposes as if fully set forth herein. The apparatus includes one or more containers for holding a concentrated drink, water supply, a mixing unit for mixing the concentrated drink with the water into a substantially homogeneous liquid mixture, an ice making unit assembly for freezing at least a portion of the freshly produced liquid mixture into ice cubes containing substantially identical ice quantity, a crushing and blending unit for crushing a pre measured amount of the ice cubes into small, drinkable ice particles, and blending the ice particles with a pre measured amount of freshly produced liquid mixture.

There is a need for and it would be advantageous to have a made-to-order apparatus for dispensing freshly prepared frozen beverage having a controlled balance of liquid and ice.

BRIEF SUMMARY OF THE INVENTION

A principal intention of the present invention includes an apparatus for dispensing a made-to-order, freshly prepared frozen beverage having a controlled balance of liquid and ice. The apparatus is preferably controlled by a computerized control unit and thereby the resulting ice beverages are substantially repeatable.

According to the teachings of the present invention, there is provided an apparatus for preparing and dispensing a flavored ice beverage, including at least one container for holding flavor ingredients, a blending unit including a blender container and a blending mechanism, an ice flakes supplying unit, a mechanism for transferring the flavor ingredients to the blender container and a computerized control unit for controlling one or more aspects of the process of producing the ice beverage. The flavor ingredients can be in grain form, powder form or in liquid form.

The ice flakes supplying unit includes an ice flakes making device for producing ice flakes, an ice flakes container, an ice flakes intermixing mechanism and a conveying mechanism for transferring the ice flakes from the ice flakes holding and mixing unit to the blender container. The ice flakes making device produces ice flakes that are generally of similar dimensions. The ice flakes intermixing mechanism intermixes the ice flake, such that substantially no ice mounds are piled up and such that the lower part of the ice flakes container is filled with a substantially uniform mixture of the ice flakes.

Optionally, the ice flakes intermixing mechanism includes a generally disc shaped rotating plate having two faces and a rotational axis, disc rods extending generally perpendicular from the faces of the plate, and wall rods extending generally perpendicular from the inner surfaces of the walls of the ice flakes container. The disc rods and wall rods may have various dimensions. Openings formed on the plate, away from the rim of the plate, facilitating a movement of portions of the ice flakes from one side of the plate to the other side of the plate. A rotating mechanism, preferably controlled by the computerized control unit, rotates the plate about the plate axis, in either direction. Optionally, the rotating mechanism rotates the plate back and forth about the plate axis, periodically. It should be noted that the plate faces may not be flat.

The mechanism for transferring the flavor ingredients transfers the flavor ingredients from the containers for holding flavor ingredients, to the blender container. The conveying mechanism for transferring the ice flakes, transfers the ice flakes from the ice flakes holding and mixing unit, to the blender container. Optionally, the conveying mechanism for transferring the ice flakes includes an Archimedes screw. The blending mechanism blends a pre-measured amount of the ice flakes, transferred from the ice flakes making unit, with a pre-measured amount of the flavor ingredients, transferred from the least one container, thereby producing the flavored ice beverage.

Preferably, the apparatus for preparing and dispensing a flavored ice beverage further includes a refrigerated housing, wherein the ice flakes supplying unit is disposed inside the housing. Preferably, the blending unit is also disposed inside the housing. Preferably, the housing is substantially sealed and the temperature inside the housing is controlled by the computerized control unit.

Preferably, the apparatus of for preparing and dispensing a flavored ice beverage further includes a liquid supplier of a base liquid, preferably water and a mechanism for transferring the base liquid to the blender container, wherein the mechanism for transferring the base liquid, transfers the base liquid from the liquid supplier to the blender container; and wherein the blending unit blends a pre-measured amount of the ice flakes, transferred from the ice flakes making unit, with a pre-measured amount of the flavor ingredients, transferred from the least one container, and a pre-measured amount of the base liquid, transferred from the supply of the base liquid, thereby producing the flavored ice beverage. The base liquid may be sparkled.

Preferably, the blending unit further includes a pivoting mechanism, wherein the pivoting mechanism facilitates pivotal motion of the blending unit.

Optionally, the ice flakes container includes a bottom surface having a first end and a second end, an opening formed at the first end of the bottom surface, facilitating the dispensing of the ice flake from the ice flakes container, and an opening formed at the second end of the bottom surface, facilitating the dispensing of accumulated water from the ice flakes container. The first end of the bottom surface is higher than the second end of the bottom surface, thereby, water accumulated on the bottom surface flows by the force of gravity towards the opening formed at the second end of the bottom surface. Optionally, the water dispensed from the opening formed at the second end of the bottom surface, is collected, and is reused by the apparatus for preparing and dispensing a flavored ice beverage.

Preferably, the ice flakes container includes a sensing device for sensing the level of accumulated ice flakes inside the ice flakes container.

Optionally, the apparatus for preparing and dispensing a flavored ice beverage further includes a protective cover unit coupled to protect the surroundings of the blending unit, particularly when the blending unit is in an operative state. Preferably, the protective cover unit includes a sealer, wherein the sealer seals the blending unit, the blending unit being in the blending state position.

Optionally, the apparatus for preparing and dispensing a flavored ice beverage further includes a washing unit for rinsing and optionally washing the inner surfaces of the blender container.

Optionally, the apparatus for preparing and dispensing a flavored ice beverage further includes a mixing unit for mixing the flavor ingredients and the base liquid, thereby producing a substantially homogeneous liquid mixture, wherein the blending unit blends a pre-measured amount of the ice flakes with a pre-measured amount of the liquid mixture thereby producing the flavored ice beverage.

Optionally, the liquid supplier is an operative connection to external water supply source. The liquid supplier may also be a container.

Optionally, the apparatus for preparing and dispensing a flavored ice beverage further includes a vessel dispensing unit.

Optionally, the apparatus for preparing and dispensing a flavored ice beverage further includes a straw dispensing unit.

An aspect of the present invention is to provide a method for preparing and dispensing a flavored ice beverage. The method includes providing an apparatus for preparing and dispensing a flavored ice beverage, wherein the apparatus includes an ice flakes supplying unit for producing ice flakes, at least one container for holding flavor ingredients and a blending unit. The blending unit includes a blender container, a blending mechanism and a pivoting mechanism, wherein the blender container includes a receiving opening formed preferably at the top of the blender container, and wherein the pivoting mechanism facilitates pivotal motion of the blending unit. The apparatus further includes a conveying mechanism for transferring the ice flakes from the ice flakes supplying unit to the blending unit, and a mechanism for transferring the flavor ingredients to the blending unit.

The method further includes the steps of selecting a flavored ice beverage, pivoting the blending unit to a receiving state position, wherein at the receiving state position, the blending unit is in position to receive the flavor ingredients and the ice flakes, transferring the flavor ingredients to the blending unit, transferring the ice flakes to the blending unit, pivoting the blending unit to a blending state position, wherein at the blending state position, the blending unit is in position is preferably inclined with respect to an upright position, activation the blending mechanism for a predetermined time interval, thereby producing the ice beverage, and delivering the ice beverage.

Preferably, in the receiving state position, the blending unit is in an upwardly position. Preferably, in the blending state position, the blending unit is substantially sealed. Optionally, the receiving state position and the blending state position are at the same pivotal position.

In variations of the present invention, the provided apparatus for preparing and dispensing a flavored ice further includes a liquid supplier of a base liquid, preferably water, and a mechanism for transferring the base liquid to the blending unit, and the method further including includes the step of transferring the base liquid to the blending unit, the blending unit being at the receiving state position.

In variations of the present invention, the provided apparatus for preparing and dispensing a flavored ice further includes an ice flakes intermixing mechanism, and the method further including includes the step of activating the ice flakes intermixing mechanism shuffle the ice flakes inside the ice flakes container, thereby maintain a substantially uniform mixture of ice flakes inside the ice flakes container.

In variations of the present invention, the provided apparatus for preparing and dispensing a flavored ice further includes a vessel dispensing unit, and the method further including includes the step of dispensing a cup from the a vessel dispensing unit, before the delivering of the ice beverage.

BRIEF DESCRIPTION OF THE DRAWINGS

The present invention will become fully understood from the detailed description given herein below and the accompanying drawings, which are given by way of illustration and example only and thus not limitative of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

Figure 1:
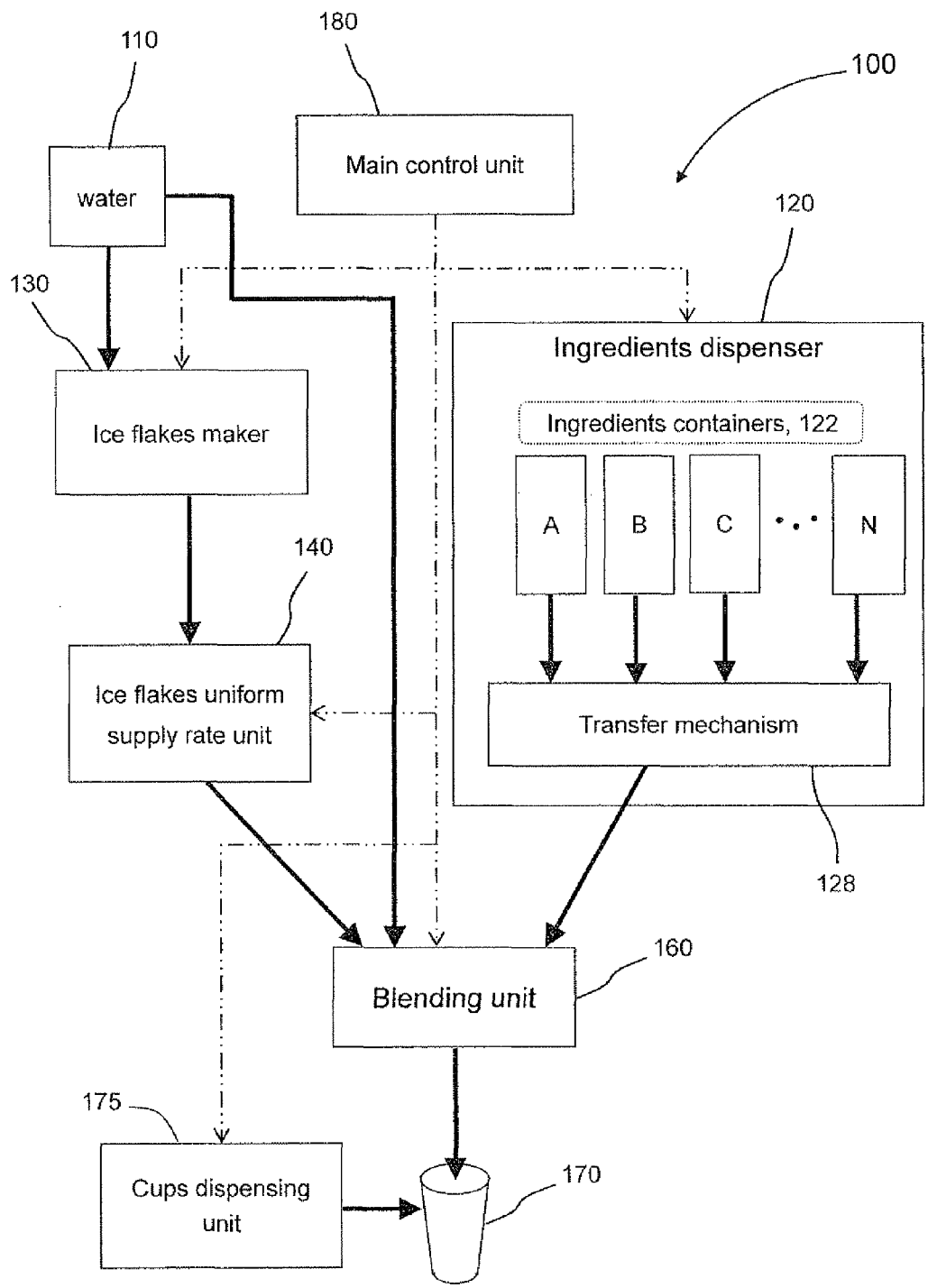
FIG. 1 is a schematic block diagram of an apparatus for preparing and dispensing flavored ice beverages, according to embodiments of the present invention.

Reference now made to the drawings. FIG. 1 is a schematic block diagram of apparatus 100 for preparing and dispensing flavored ice beverages, according to embodiments of the present invention. Apparatus 100 includes water source 110, flavor ingredients dispenser 120, ice flakes supplying unit 140 including ice flakes maker 130, blender 160 and optionally, cup dispensing unit 175.

Flavor ingredients dispenser 120 can be embodied in any embodiment known in the art for dispensing ingredients for the preparation of flavored liquid drinks. In the example shown in FIG. 1, flavor ingredients dispenser 120 includes ingredients containers 122A to 122N, containing flavored concentrated or non-concentrated ingredients for making selected flavored drinks, such as juices, coffee, alcoholic drinks, chocolate and other flavored drinks. The concentrated ingredients can be in liquid form or preferably in powder form, which is characterized by a longer shelf life.

It should be noted that water source 110 can be a container 122 or an operative connection to external water supply source.

Ice flakes supplying unit 140 includes ice flakes maker 130, which is a conventional ice flakes maker, facilitated to draw water from water source 110 through transfer mechanism 118. Ice flakes maker 130 produces ice flakes 136, which are generally uniform in size, and which are dispensed through an opening 132 formed in ice flakes maker 130, and which ice flakes 136 are dropped into ice flakes supplying unit 140. Ice flakes supplying unit 140 is facilitated to transfer a repetitive, pre-measured quantity of ice flakes to blender 160, having a substantially uniform density, the transfer being controlled by control unit 180. Computerized control unit 180 controls the level of uniform ice flakes accumulated inside ice flakes supplying unit 140. In variations of the present invention, ice flakes maker 130, which is a conventional ice flakes maker, facilitated to draw flavored liquid from a respective flavored liquid source. Ice flakes maker 130 then produces ice flakes 136 then produces from the flavored liquid.

Apparatus 100 further includes a substantially sealed housing (not shown), which housing is refrigerated to a predefined temperature, controlled by control unit 180. In variations of the present invention, control unit 180 controllably monitors the temperature inside the housing such that the temperature does not surpass a predetermined threshold temperature. In frozen beverage preparation there are special system temperature control requirements in order to optimize the system performance and subsequent beverage quality. In one embodiment, there are two separate compartments which are independently temperature controlled. In a particular embodiment, an inner compartment, controlled to a lower temperature is contained within an outer compartment. The inner compartment is typically where ice flakes 136 are produced. This architecture has the additional advantage of providing reduced refrigeration energy consumption and more accurate compartment temperature control.

When a selected flavored ice beverage is being prepared, selected flavor ingredients are transferred to blender 160. Optionally, a base liquid, preferably water from water supply unit 110, is also transferred to blender 160, whereas the ratio between the transferred ingredients from one or more containers, such as containers 122, as well as the water, is controlled by a computerized control unit 180. Ice flakes 136 are also transferred from ice flakes supplying unit 140 to blender 160. The transferred quantities of flavor ingredients (from ingredients dispenser 120) and uniform ice flakes 136 (from ice flakes supplying unit 140) are controlled by a computerized control unit 180. The present invention will be now described through preparing an ice beverage prepared with water, but the present invention is not limited to the usage of water as a base liquid and any other base liquid can be user, including milk, juice or any other drinkable liquid.

Blender 160 blends the selected flavor ingredients, ice flakes 136 and the water to the required texture of the ice beverage and pours the freshly prepared ice beverage to a cup 170, which is synchronously dispensed from cups dispensing unit 175, or manually place.

Figure 2:
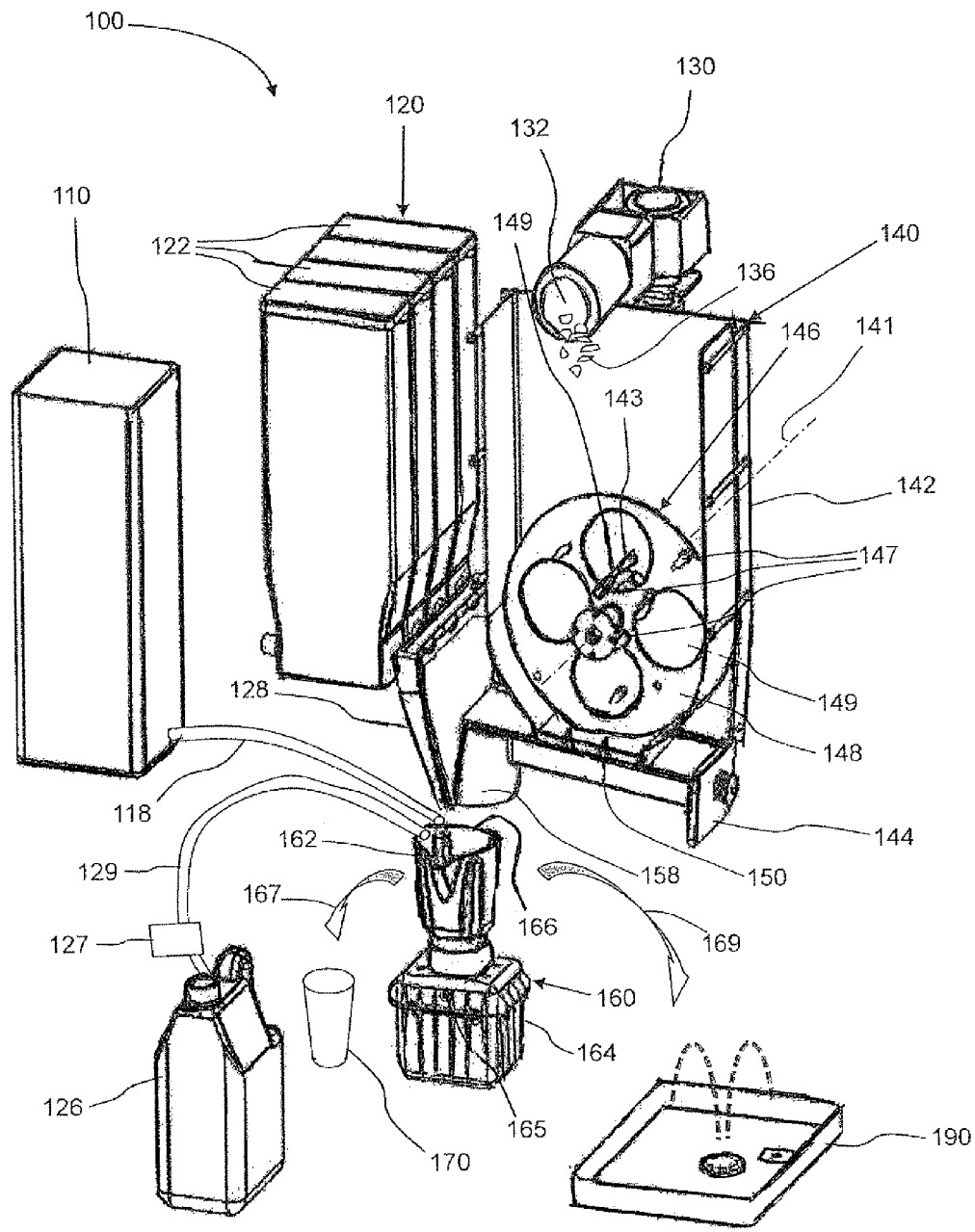
FIG. 2 is a perspective view illustration of the apparatus for preparing and dispensing flavored ice beverages, as illustrated in FIG. 1.

Reference is also made to FIG. 2, which is a perspective view illustration of main components of an example apparatus 100 for preparing and dispensing flavored ice beverages, according to embodiments of the present invention. In this example, flavor ingredients dispenser 120 includes four containers 122, each containing flavor ingredients, to be selected from. Apparatus 100 may further include other containers of flavor ingredients, for example, container 126 containing concentrated flavored liquid.

When a container 122 or 126 is selected, computerized control unit 180 releases a pre-measured amount of the selected flavor ingredients, which flavor ingredients are then transferred through a mechanism 128 or 129, respectively, for transferring the flavor ingredients to blending unit 160. Transfer mechanisms 118, 128 and/or 129 may include additional transfer elements, such as a pump 127.

In embodiments of the present invention, a stream of heated or cooled or ambient temperature water is used to carry powder flavor ingredients from dispensing mechanism 128 into blender. In a further embodiment, intermixing is preset and the dispensing mechanism is parallelized, i.e. a discrete set of predetermined mixes are available which are directly transferred to blending unit 160.

Figure 3:
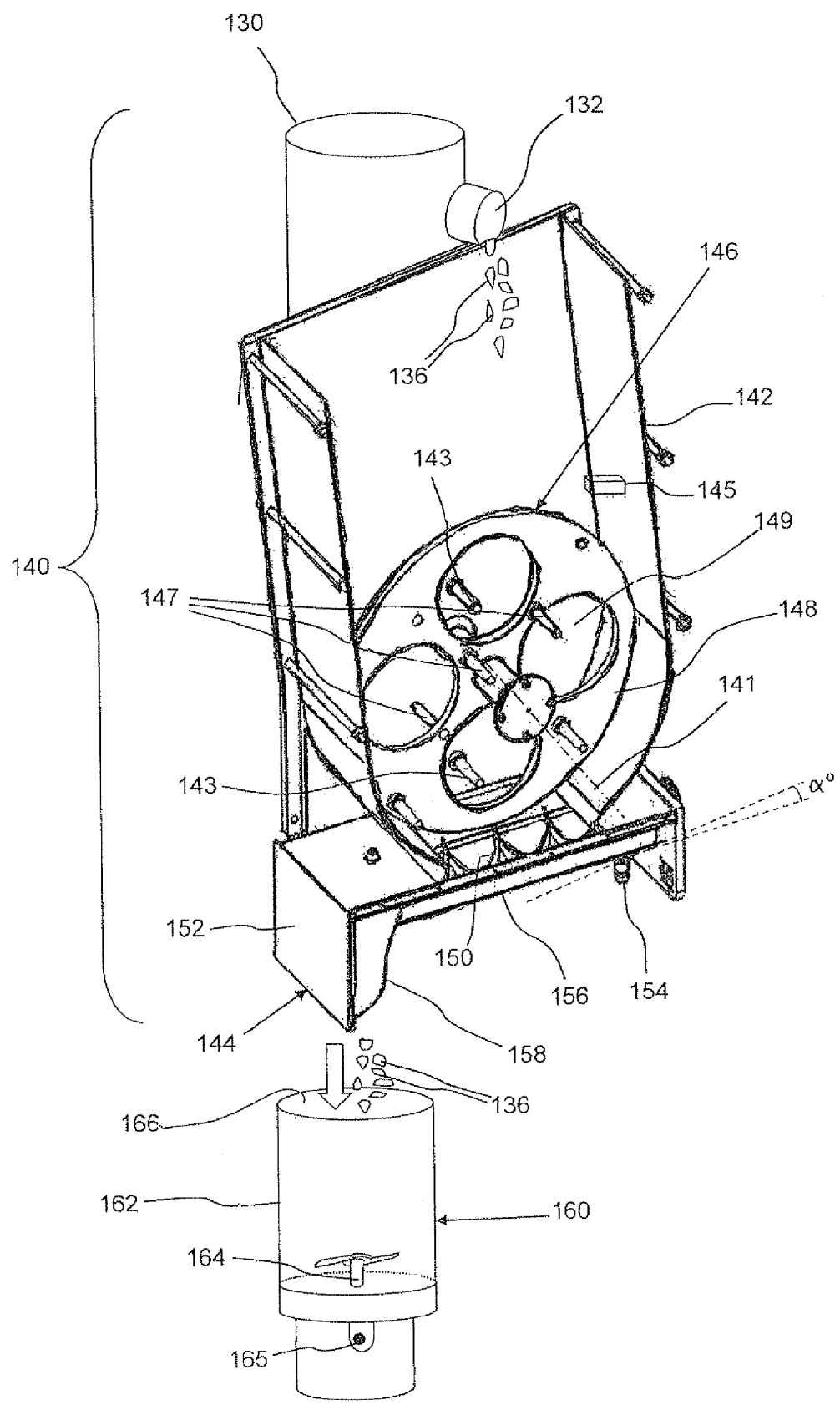
FIG. 3 is a perspective view illustration of the ice flakes supplying unit of the apparatus for preparing and dispensing flavored ice beverages shown in FIG. 2.

Reference is also made to FIG. 3, which is a perspective view illustration of ice flakes supplying unit 140 of apparatus 100. Ice flakes supplying unit 140 includes ice flakes maker 130, an ice flakes intermixing mechanism 146 and an ice flake container having lower part 144 and upper part 142, which are combined into a single compartment and may be embodied from a single unit. Ice flakes maker 130 is disposed at the upper end of upper part 142 of ice flakes supplying unit 140, producing ice flakes 136, which are generally of similar dimensions, and which are dropped through an opening formed at the upper end of upper part 142. In variations of the present invention, the upper end of upper part 142 of ice flakes supplying unit 140 includes a lid (not shown) having an opening through which ice flakes 136 drop into ice flakes supplying unit 140.

Ice flakes supplying unit 140 further includes ice flakes intermixing mechanism 146, which intermixes ice flake 136, being dropped from ice flakes maker 130, such that substantially no ice mounds are piled up and such that lower part 144 of ice flakes supplying unit 140 is filled with a substantially uniform mixture of ice flakes. Ice flakes supplying unit 140 further includes a conveying mechanism 150, disposed inside lower part 144 of ice flakes supplying unit 140. Ice flakes intermixing mechanism 146 can be embodied in various ways. In the example shown in FIGS. 2 and 3, ice flakes intermixing mechanism 146 includes disc shaped plate 148 on which rods 147, having various dimensions, are affixed at various locations. Ice flakes intermixing mechanism 146 may further includes rods 143, which are disposed on the inner walls of upper part 142. Ice flakes intermixing mechanism 146 further includes openings 149 formed on plate 148 away from the rim of plate 148, allowing ice flakes 136 to move from one side of plate 148 to the other side. Typically, ice flakes intermixing mechanism 146 rotates periodically, back and forth about axis 141, whereas rods 147 and rods 143 intermix ice flakes 136, to form and maintain a uniform mixture. It should be noted the plate 148 has a generally disc-like shape, but the present invention is not limited for plate 148 to have a disc-like form.

Figure 4:
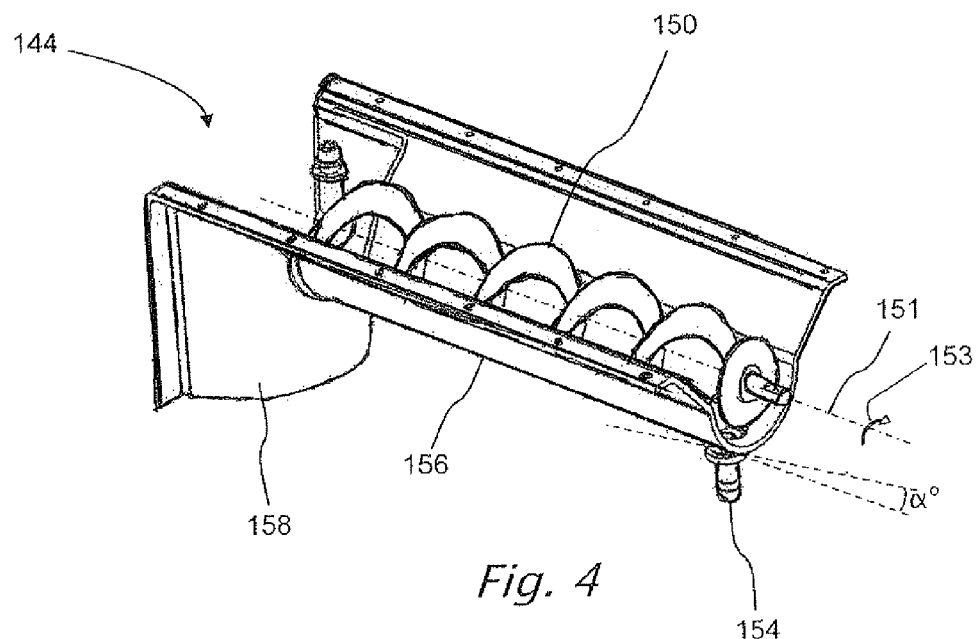
FIG. 4 is a perspective view illustration of the lower part of ice flakes supplying unit, shown in FIG. 3.

Reference is also made to FIG. 4, which is a perspective view illustration of lower part 144 of ice flakes supplying unit 140, including conveying mechanism 150 for transferring ice flakes 136 from ice flakes supplying unit 140 towards blender 160. When conveying mechanism 150 is rotated about axis 151 in direction 153, by a motor (not shown), ice flakes 136 are shoved through an opening formed by walls 158 and 152, towards blender 160. Optionally, conveying mechanism 150 includes an Archimedes screw.

Preferably, the bottom 156 of lower part 144 is slightly slanted, by an angle α°, such that the end bottom 156 proximal to wall 152 is higher than the other end of bottom 156, distal from the front wall 152. Thereby, any water accumulated at the bottom 156 of lower part 144, flows by the force of gravity away from wall 158 and collected and optionally recycled, as the water flow out of lower part 144 through a draining pipe 154 disposed proximal to the end of bottom 156 distal from wall 152.

Preferably, ice flakes supplying unit 140 further includes a sensing device 145 (see FIG. 3) which senses the level of accumulated ice flakes 136 inside the ice flakes container. When the level of ice flakes 136 inside the ice flakes container is below some predetermined threshold level, control unit 180 activates ice flakes maker 130 to produce more ice flakes 136. When the level of ice flakes 136 inside the ice flakes container is above some predetermined threshold level, control unit 180 deactivates ice flakes maker 130.

Blender 160 includes a containing body 162, having an opening formed at the top of containing body 162, and a blending mechanism 164. A pivoting mechanism facilitates the pivoting of blending unit 160 about axis 165.

In an alternative architecture blending unit 160, blender blade 164 is translated, for example in the vertical direction, independently of containing body 162, in order to bring the blades into contact with the flavored ingredients, water and ice flakes, which have been transferred into containing body 162. In a further embodiment, blender blade 164 is held stationary and containing body 162 is translated and or pivoted.

Control unit 180 also ensures that quantities and the ratio between the various flavor ingredients, water and ice flakes 136, all of which are transferred into container 162 of blending unit 160 through opening 166, are substantially repeatable. In blending unit 160, the pre measured quantity of ice flakes 136 are blended by blending mechanism 164 with the pre measured quantity of ice flakes 136 and the pre measured quantity of water and flavor ingredients, thereby producing the requested flavored ice beverage. The freshly prepared flavored ice beverage is delivered into a vessel, such as cup 170, which cup 170 is either dispensed from cup dispensing unit 175 or manually placed. The freshly prepared flavored ice beverage is delivered into the vessel by a pouring mechanism such as a mechanism that inclines blending unit 160 to a pre designed downwards angle, in direction 167 towards cup 170. The inclination angle ensures a substantially repeatable pouring rate of the freshly prepared flavored ice beverage, which is timed by control unit 180. The pouring rate of the freshly prepared flavored ice beverage can be variable, controlled by control unit 180.

It should be noted that a number of different alternatives may be used to empty the ice beverage into cup 170. In addition or instead of the option of pivoting blender 160, as already described, a valve at the base of blender 160 may be opened to allow the contents to fall out into cup 170. Alternately, blender 160 may be set at a fixed incline and a door could open in the lower side of blender 160. An additional advantage of the fixed or variable incline architecture is that the blending action may be more affective as gravitational forces tend prevent the phase separation problem often observed in vertical blender architectures in which the blended material is not fully mixed but maintains a vertically layered structure. A further option in order to improve the effectiveness of blender 160 emptying step is the shaking or vibrating of blender 160, during pivoting to a pouring position, to ensure that the ice beverage falls into cup 170, substantially in its entirety.

Preferably, in a receiving state, when the flavor ingredients, the water and ice flakes 136 are transferred into container 162 of blending unit 160 through opening 166, blending unit 160 is generally in a upright position, but can be inclined. Preferably, in a blending state, when blending unit 160 blends the flavor ingredients, the water and ice flakes 136, blending unit 160 is slightly inclined with respect to the upright position. The inclination of blending unit 160 in the blending state, prevents the accumulation of ingredients on the inside walls of container 162, thereby improving the uniformity of the flavored ice beverage being produced.

Figure 5:
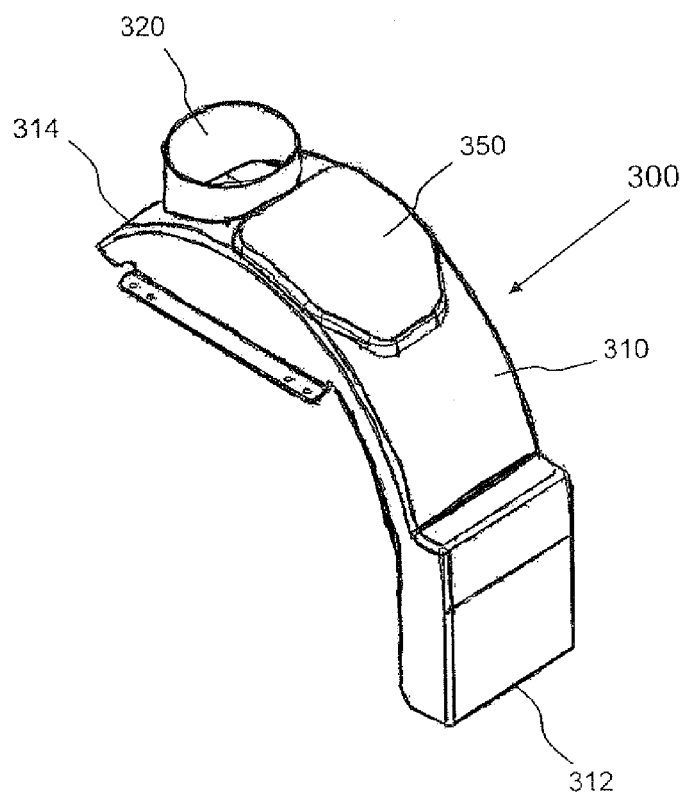
FIG. 5 is a top perspective view illustration of the protective cover unit coupled with the blending unit coupled to protect the surroundings of the blending unit of the dispensing flavored ice beverages shown in FIG. 2.
Figure 6:
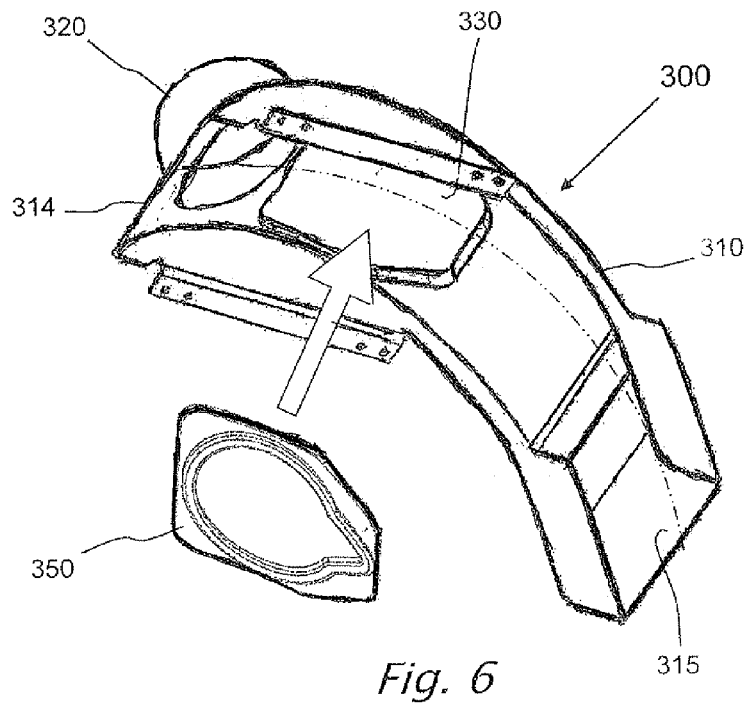
FIG. 6 is a bottom perspective exploded view illustration of the protective cover unit shown in FIG. 5.

Preferably, ice flakes supplying unit 140 further includes a protective cover unit 300, coupled to protect the surroundings of blending unit 160 in the various operating states. Reference is made to FIG. 5, which is a top perspective view illustration of protective cover unit 300; and to FIG. 6, which is a bottom perspective exploded view illustration of the protective cover unit 300.

Protective cover unit 300 includes a generally arched body 310, an ingredients receiving part 320, and a sealer 350 fittingly inserted into opening 330 formed in body 310. Protective cover unit 300 is affixed in position inside apparatus 100, while blending unit 160 can move just below protective cover unit 300, depending on the working state of blending unit 160.

Figures 7A, 7B:
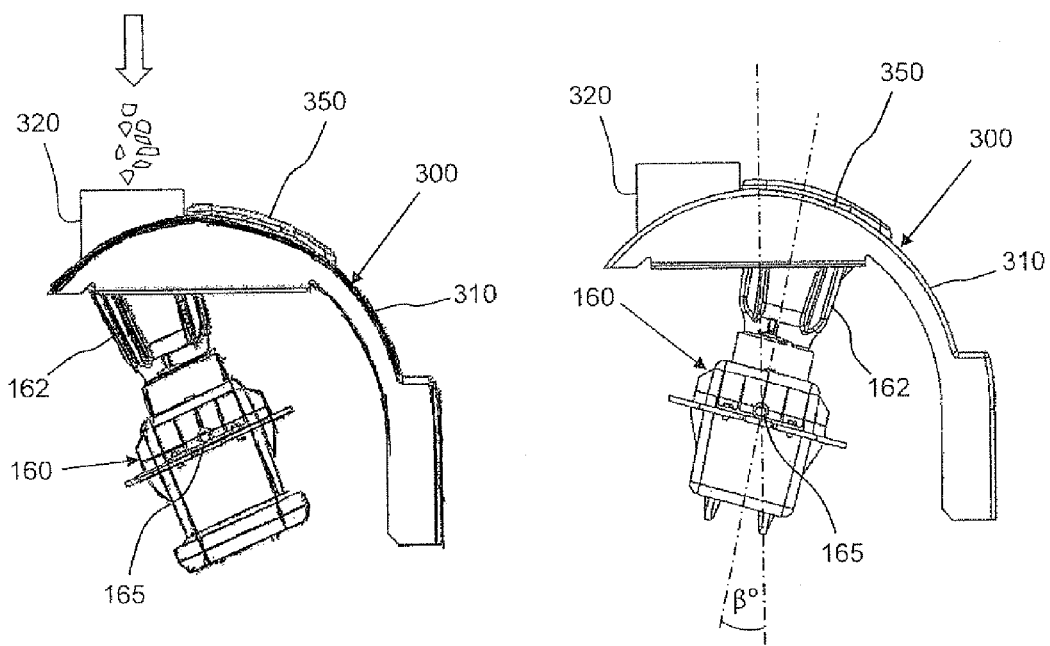
FIG. 7a is a side view illustration of the protective cover unit shown in FIG. 5 coupled with the blending unit, which is in a receiving state.
FIG. 7b is a side view illustration of the protective cover unit shown in FIG. 5 coupled with the blending unit, which is in a blending state.

Reference is also made to FIG. 7a, which is a side view illustration of protective cover unit 300 coupled with blending unit 160, wherein blending unit 160 is in a receiving state; and to FIG. 7b, which is a side view illustration of protective cover unit 300 coupled with blending unit 160, wherein blending unit 160 is in a blending state. When blending unit 160 is in a receiving state (see FIG. 7a), blending unit 160 is in an upwardly position, wherein opening 166 is aligned with the opening formed in ingredients receiving part 320, such that ingredients transferred to blending unit 160, pass through the opening formed in ingredients receiving part 320, and then through opening 166 of blending unit 160.

When blending unit 160 is in a blending state (see FIG. 7b), blending unit 160 is pivoted about axis 165, to form an inclination angle of $\beta°$ with respect to the upright position. The inclination of blending unit 160 in the blending state, prevents the accumulation of ingredients on the inside walls of container 162, thereby improving the uniformity of the flavored ice beverage being produced. Sealer 350 is made of elastic materials such as rubber, and is designed to fittingly seal opening 166 of blending unit 160, when blending unit 160 is in a blending state. Thereby, when blending unit 160 is in a blending state, protective cover unit 300 prevents spattering of the ice beverage being prepared.

The use of ingredients which are perishable may in some cases make advisable or mandatory the periodic rinsing or optionally washing of blender container 162. Rinsing or optionally washing of blender container 162 may also be required in order to eliminate residual flavor contamination between beverages. In embodiments of the present invention, the mechanism for pivoting blending unit 160 about axis 165, inclines blending unit 160 to a washing state, in direction 169 (see FIG. 2), towards washing unit 190 which washes and/or rinses blending unit 160. Blending unit 160 is then pivoted back to the receiving state position, ready for the next requested for a made-to-order ice beverage. In variations of the present invention, blending unit 160 in not inclined towards a washing unit, but rather water and optionally soap are transferred into blending unit 160, being in a receiving state. Blending unit 160 is then pivoted to the blending state and is operated to self wash and/or rinse. Blending unit 160 is then pivoted towards a waste disposal unit to dispose the content of container 162. In an alternative architecture, to enable rinsing or washing of blender container 162, a rotating sprinkler head is inserted into container 162, container 162 being in the inverted position. An edible disinfectant may be used during the container washing step.

In embodiments of the present invention, control unit 180 includes a beverage quality assessment unit, which analyzes quality parameters such as the viscosity, temperature, texture, etc. of the flavored ice beverage being prepared and adjust the controls, as needed, to comply with the quality required from the selected flavored ice beverage.

In variations of the present invention, the pivotal position of blender 160 in the receiving state and the blending state is the same position.

It should be noted, that after completion of the preparation of the ice beverage, but prior to serving, the beverage may be non-uniformly distributed within the cup. A typical issue is the presence of a conical top to the ice beverage, which may tend to easily spill if cup 170 is for example, held by small children. In order to overcome this problem, beverage cup 170 may be set on a vibrating platform which vibrates cup 170 during or subsequent to the dispensing into cup 170. Another feature that could be optionally added to apparatus 100 is an automated straw dispensing action at the end of the beverage preparation sequence.

Figure 8:
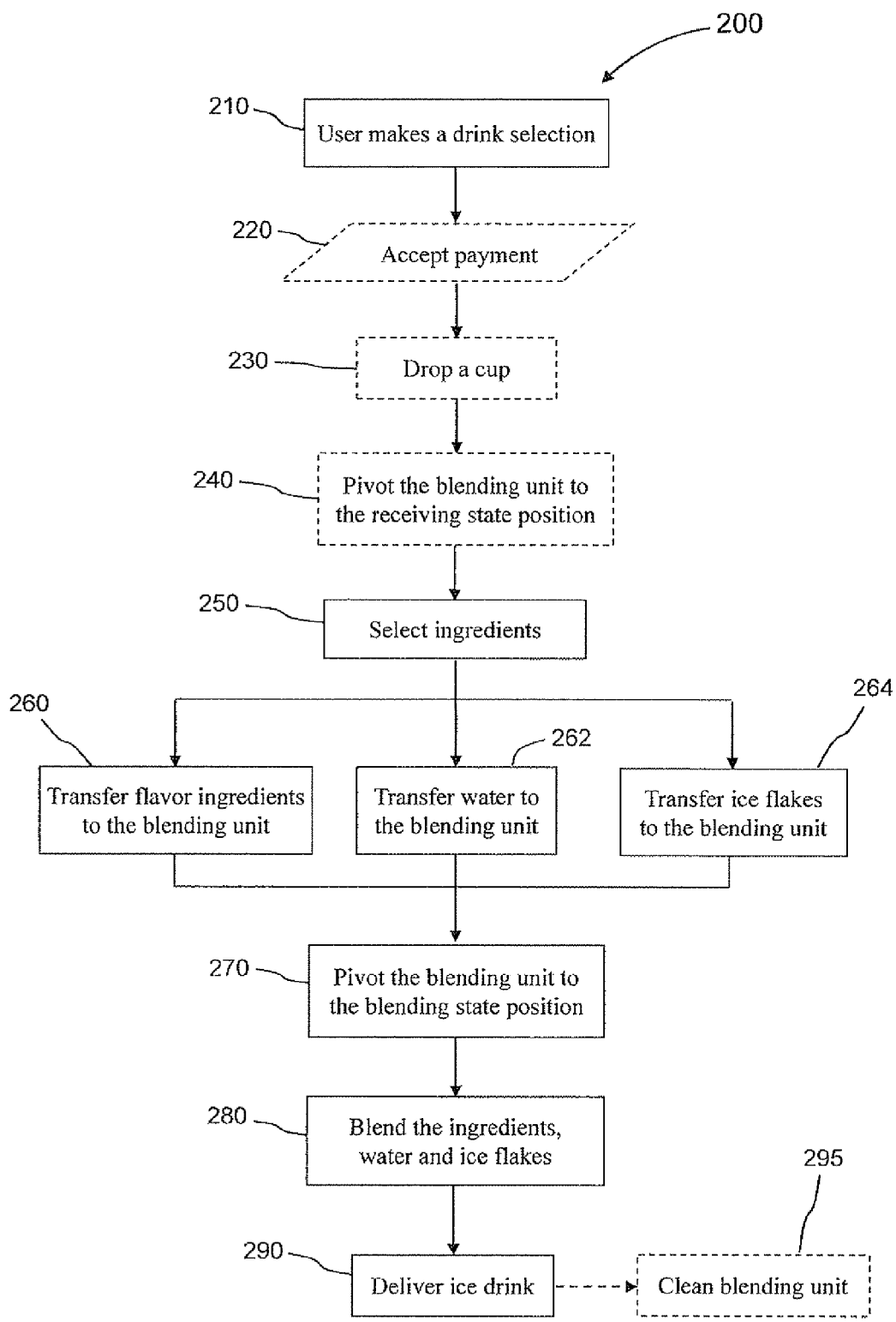
FIG. 8 is a schematic flow diagram that outlines the successive steps of a process of for preparing and dispensing flavored ice beverage, from selecting a flavored ice beverage till the delivering the flavored ice beverage, performed by an apparatus as shown in FIGS. 1 and 2, according to embodiments of the present invention.

Reference is now made to FIG. 8, which is a schematic flow diagram that outlines an example process 200 of preparing a made-to-order flavored ice beverage, from selection till delivery of the flavored ice beverage, using apparatus 100, according to embodiments of the present invention. Process 200 starts by a user making a beverage selection, in step 210. It should be noted that apparatus 100 may include just one optional ice beverage, in which case step 210 is skipped. If apparatus 100 is a payment-operated vending machine, the user makes a payment in step 220, to commence an automatic process of preparing the selected flavored ice beverage. If apparatus 100 is a payment-operated vending machine, a cup 170 is dropped at a predetermined location in step 230. Process 200 proceeds as follows:

Step 240: Pivot blending unit 160 to the receiving state position.
  Control unit 180 pivots blending unit 160 to the receiving state position. Typically, blending unit 160 is set to an upwardly position, whereas opening 166 is aligned with the opening formed in ingredients receiving part 320, of protective cover unit 300.
Step 250: Select ingredients.
  Control unit 180 selects the one or more containers 122/126, from which containers ingredients corresponding to the selected ice beverage.
Step 260: Transfer flavor ingredients to the blending unit.
  Control unit 180 activates transfer mechanism 128 and/or 129 to transfer a pre measured amount of flavor ingredients to blending unit 160.
Step 262: Transfer water to the blending unit.
  Control unit 180 activates transfer mechanism 110 to transfer a pre measured amount of water to blending unit 160.
Step 264: Transfer ice flakes to the blending unit.
  Control unit 180 activates ice flakes conveying mechanism 150 for transferring a pre measured amount of ice flakes 136 from ice flakes supplying unit 140 towards blender 160.
It should be noted that steps 260, 262 and 264 can be performed sequentially or in parallel.
Step 270: Pivot blending unit 160 to the blending state position.
  Preferably, control unit 180 pivots blending unit 160 about axis 165, to form an inclination angle of $\beta°$ with respect to the upright position. Sealer 350 of protective cover unit 300 seals opening 166 of blending unit 160, when blending unit 160 is in the blending state position.
Step 280: Blend the ingredients, water and ice flakes.
  Control unit 180 activates water to blending unit 160 for a predetermined time interval, thereby producing the selected ice beverage. The controlled process of producing the selected ice beverage results in an ice beverage repeatably has substantially the same content, texture and flavor.
Step 290: Deliver ice beverage.
  Control unit 180 pivots blending unit 160 about axis 165, towards cup 170 at a predesigned inclination angle, such that produced ice beverage is poured into cup 170, substantially in its entirety, at a predetermined pouring rate.

Step 295: Clean blending unit 160.

Preferably, before resetting apparatus 100 to be ready for the next request for preparing a new made-to-order ice beverage, control unit 180 pivots blending unit 160 about axis 165, towards washing unit 190 which is activated to wash and/or rinse blending unit 160.

It should be noted that some steps of process 200 can be activated in a different order, for example, steps 210 and 220 can be interchanged and step 230 can be at any time before delivering the ready to serve flavored ice beverage.

Figure 9:
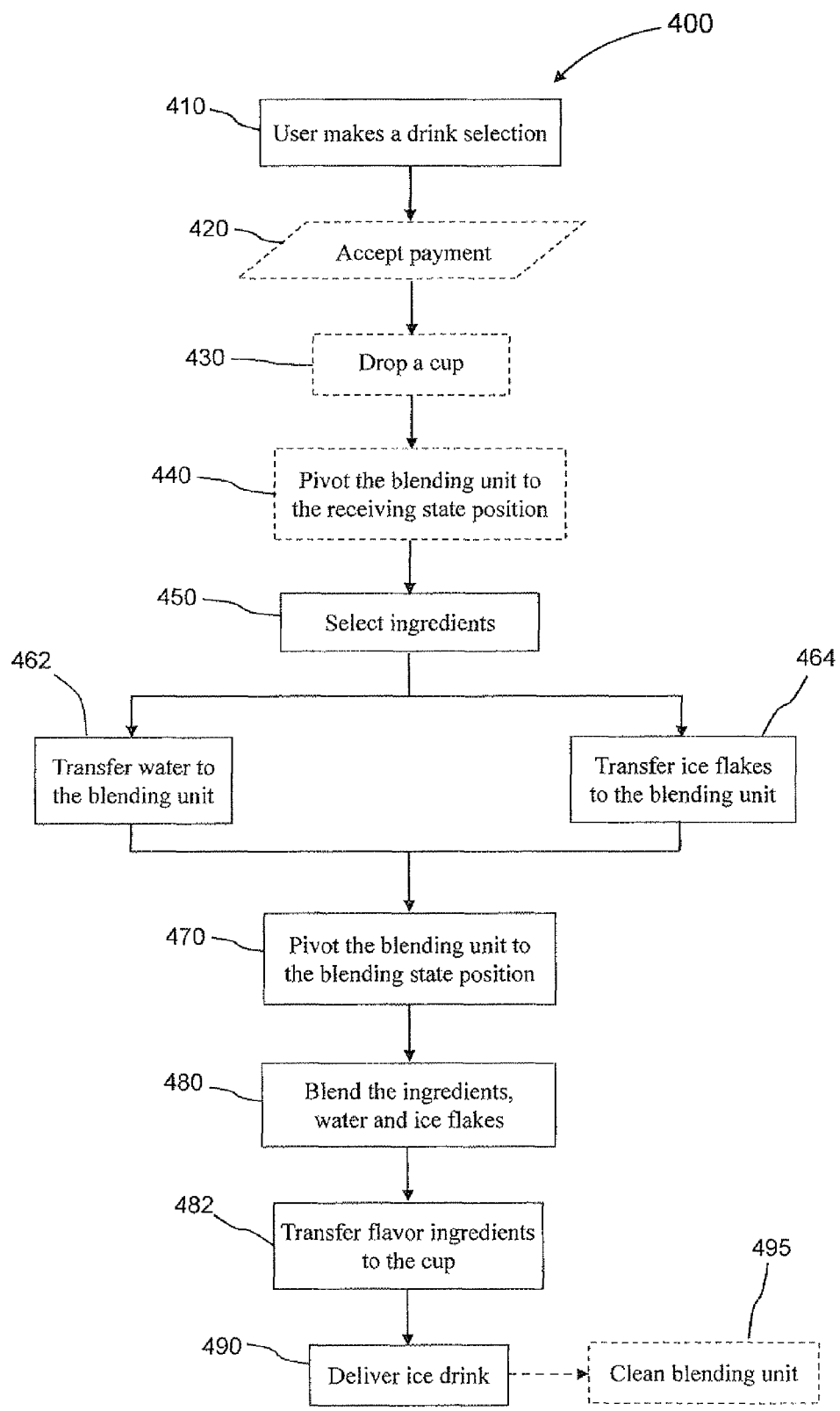
FIG. 9 is a schematic flow diagram that outlines the successive steps of a variation of the process outlined in FIG. 8.

Reference is now made to FIG. 9, which is a schematic flow diagram that outlines an example process 400 of preparing a made-to-order flavored ice beverage, from selection till delivery of the flavored ice beverage, using apparatus 100, according to embodiments of the present invention. Process 400 starts by a user making a beverage selection, in step 410. It should be noted that apparatus 100 may include just one optional ice beverage, in which case step 410 is skipped. If apparatus 100 is a payment-operated vending machine, the user makes a payment in step 420, to commence an automatic process of preparing the selected flavored ice beverage. If apparatus 100 is a payment-operated vending machine, a cup 170 is dropped at a predetermined location in step 430. Process 400 proceeds as follows:

Step 440: Pivot blending unit 160 to the receiving state position.

Control unit 180 pivots blending unit 160 to the receiving state position. Typically, blending unit 160 is set to an upwardly position, whereas opening 166 is aligned with the opening formed in ingredients receiving part 320, of protective cover unit 300.

Step 450: Select ingredients.

Control unit 180 selects the one or more containers 122/126, from which containers ingredients corresponding to the selected ice beverage.

Step 462: Transfer water to the blending unit.

Control unit 180 activates transfer mechanism 110 to transfer a pre measured amount of water to blending unit 160.

Step 464: Transfer ice flakes to the blending unit.

Control unit 180 activates ice flakes conveying mechanism 150 for transferring a pre measured amount of ice flakes 136 from ice flakes supplying unit 140 towards blender 160.

It should be noted that steps 462 and 464 can be performed sequentially or in parallel.

Step 470: Pivot blending unit 160 to the blending state position.

Preferably, control unit 180 pivots blending unit 160 about axis 165, to form an inclination angle of $\beta°$ with respect to the upright position. Sealer 350 of protective cover unit 300 seals opening 166 of blending unit 160, when blending unit 160 is in the blending state position.

Step 480: Blend the ingredients, water and ice flakes.

Control unit 180 activates water to blending unit 160 for a predetermined time interval, thereby producing the selected ice beverage. The controlled process of producing the selected ice beverage results in a mixture having repeatably, substantially the same content and texture.

Step 482: Transfer flavor ingredients to cup 170.

Control unit 180 activates transfer mechanism 128 and/or 129 to transfer a pre measured amount of flavor ingredients directly to cup 170. Typically but not limited to, in this embodiment, the flavor ingredients are in liquid form.

Step 490: Deliver ice beverage.

Control unit 180 pivots blending unit 160 about axis 165, towards cup 170 at a predesigned inclination angle, such that the produced ice beverage is poured into cup 170, substantially in its entirety, at a predetermined pouring rate.

Step 495: Clean blending unit 160.

Preferably, before resetting apparatus 100 to be ready for the next request for preparing a new made-to-order ice beverage, control unit 180 pivots blending unit 160 about axis 165, towards washing unit 190 which is activated to wash and/or rinse blending unit 160.

It should be noted that some steps of process 400 can be activated in a different order, for example, steps 410 and 420 can be interchanged and step 430 can be at any time before delivering the ready to serve flavored ice beverage.

In embodiments of the present invention, apparatus 100 is set to produce and deliver the same flavor ice beverage. In this embodiment steps 210/410 and 250/450 are omitted from processes 200/400, respectively.

In embodiments of the present invention, apparatus 100 is set to produce and deliver multiple flavored ice beverage portions to a single serving. For example, firstly, apparatus 100 produces and delivers a coffee flavored ice beverage, which fills a first portion of cup 170. Secondly, apparatus 100 produces and delivers a vanilla flavored ice beverage, which is poured over the coffee flavored ice beverage portion, and generally fills the remaining space of cup 170.

In embodiments of the present invention, the water supplied by water supply unit 110, are sparkling water.

In embodiments of the present invention, the water supplied by water supply unit 110, contain other liquids such as juice, fruit juice, milk, yogurt, alcoholic beverage or any other drinkable liquid.

In embodiments of the present invention, the action of ice dispensing and quantification is performed by the forming of ice cubes of specific size; the amount of ice which is dispensed by an ice dispenser is then controlled by discrete counting of the number of ice cubes of predetermined and controlled size. Such a system could also be configured in which the ice cubes fall onto a belt or conveyor system in which an electronic eye or any other discrete object counting mechanism is used to count out ice cubes.

In yet other embodiments, a multiple sectioned container is used in which each section contains a predefined quantity of ice flakes. In a further embodiment, ice flakes are created by freezing in free fall, akin to snow making machines. In this case, the ice flakes quantification mechanism could be either weight or volume measurement based, by either image processing or mechanical means. Other architectures are also envisaged in which alternative combinations of the above mentioned dispensing and quantification mechanisms are combined.

In variations of the present invention, water from water supply unit 110 is transferred to a mixer, whereas the ratio between the transferred ingredients from one or more containers 122, as well as the water, is controlled by a computerized control unit 180. The mixer mixes the various ingredients with the water and when ready, the mixture is transferred to blender 160, where the mixture is blended with ice flakes 136.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for preparing and dispensing a flavored ice beverage, comprising:
   (a) at least one container for holding flavor ingredients;
   (b) a blending unit including a blender container and a blending mechanism;
   (c) an ice flakes supplying unit comprising:
      i. an ice flakes making device for producing ice flakes;
      ii. an ice flakes container;
      iii. an ice flakes intermixing mechanism; and
      iv. a conveying mechanism for transferring said ice flakes from said ice flakes holding and mixing unit to said blender container;
   (d) a mechanism for transferring said flavor ingredients to said blender container;
   (e) a computerized control unit for controlling one or more aspects of the process of producing said ice beverage,
   wherein said ice flakes making device produces ice flakes that are generally of similar dimensions;
   wherein said ice flakes intermixing mechanism intermixes said ice flakes to maintain a substantially uniform mixture of said ice flakes inside said ice flakes container, such that the lower part of said ice flakes container is filled with said substantially uniform mixture of said ice flakes;
   wherein said mechanism for transferring said flavor ingredients transfers said flavor ingredients from said containers for holding flavor ingredients, to said blender container;
   wherein said conveying mechanism for transferring said ice flakes, transfers said ice flakes from said ice flakes holding and mixing unit, to said blender container;
   wherein said blending mechanism blends a pre-measured amount of said ice flakes, transferred from said ice flakes making unit, with a pre-measured amount of said flavor ingredients, transferred from said least one container, thereby producing said flavored ice beverage; and
   wherein the apparatus is configured to reapeatably prepare and dispense said flavored ice beverage in an automated process, said ice beverage being a substantially homogeneous mixture.

2. The apparatus of claim 1 further comprises a refrigerated housing, wherein said ice flakes supplying unit is disposed inside said housing and wherein said housing is preferably substantially sealed.

3. The apparatus of claim 2, wherein said blending unit is disposed inside said housing.

4. The apparatus of claim 2, wherein the temperature inside said housing is controlled by said computerized control unit.

5. The apparatus of claim 1 further comprises:
   (a) a liquid supplier of a base liquid, preferably water; and
   (b) a mechanism for transferring said base liquid to said blender container,
   wherein said mechanism for transferring said base liquid, transfers said base liquid from said liquid supplier to said blender container; and
   wherein said blending unit blends a pre-measured amount of said ice flakes, transferred from said ice flakes making unit, with a pre-measured amount of said flavor ingredients, transferred from said least one container, and a pre-measured amount of said base liquid, transferred from said supply of said base liquid, thereby producing said flavored ice beverage.

6. The apparatus of claim 1, wherein said blending unit further comprises a pivoting mechanism, wherein said pivoting mechanism facilitates pivotal motion of said blending unit.

7. The apparatus of claim 1, wherein said ice flakes intermixing mechanism comprises:
   (a) a generally disc shaped rotating plate having two faces and a rotational axis;
   (b) disc rods extending generally perpendicular from said faces of said plate;
   (c) wall rods extending generally perpendicular from the inner surfaces of the walls of said ice flakes container;
   (d) openings formed on said plate, away from the rim of said plate, facilitating a movement of portions of said ice flakes from one side of said plate to the other side of said plate,
   wherein said disc rods and wall rods have various dimensions; and
   wherein a rotating mechanism rotates said plate about said plate axis, in either direction.

8. The apparatus of claim 7, wherein said rotating mechanism rotates said plate back and forth about said plate axis, periodically and wherein said rotating mechanism is controlled by said computerized control unit.

9. The apparatus of claim 1, wherein said ice flakes container comprises:
   (a) a bottom surface having a first end and a second end;
   (b) an opening formed at said first end of said bottom surface, facilitating the dispensing of said ice flake from said ice flakes container; and
   (c) an opening formed at said second end of said bottom surface, facilitating the dispensing of accumulated water from said ice flakes container,
   wherein said first end of said bottom surface is higher than said second end of said bottom surface, thereby, water accumulated on said bottom surface flows by the force of gravity towards said opening formed at said second end of said bottom surface.

10. The apparatus of claim 9, wherein said water dispensed from said opening formed at said second end of said bottom surface, is collected to be reused by the apparatus for preparing and dispensing a flavored ice beverage.

11. The apparatus of claim 1, wherein said ice flakes container comprises a sensing device for sensing the level of accumulated ice flakes inside said ice flakes container.

12. The apparatus of claim 1 further comprises a protective cover unit coupled to protect the surroundings of said blending unit, said blending unit being in an operative state.

13. The apparatus of claim 12, wherein said protective cover unit comprises a sealer, and wherein said sealer seals said blending unit, said blending unit being in said blending state position.

14. The apparatus of claim 1 further comprises a washing unit for rinsing and optionally washing the inner surfaces of said blender container.

15. The apparatus of claim 1 further comprises a mixing unit for mixing said flavor ingredients and said base liquid, thereby producing a substantially homogeneous liquid mixture, wherein said blending unit blends a pre-measured amount of said ice flakes with a pre-measured amount of said liquid mixture thereby producing said flavored ice beverage.

16. The apparatus of claim 1, wherein at least one of said flavor ingredients is in powder form.

17. The apparatus of claim 1, wherein at least one of said flavor ingredients is in liquid form.

18. The apparatus of claim 5, wherein said base liquid is sparkled liquid.

19. The apparatus of claim 5, wherein said liquid supplier is a container.

20. The apparatus of claim 5, wherein said liquid supplier is an operative connection to external water supply source.

21. The apparatus of claim 1, wherein said conveying mechanism for transferring said ice flakes comprises an Archimedes screw.

22. The apparatus of claim 1 further comprises a vessel dispensing unit.

23. The apparatus of claim 1 further comprises a straw dispensing unit.

24. A method for preparing and dispensing a flavored ice beverage, comprising the steps of:
  (a) providing an apparatus for repeatably preparing and dispensing a flavored ice beverage in an automated process, said apparatus including:
    i. an ice flakes supplying unit for producing ice flakes;
    ii. at least one container for holding flavor ingredients;
    iii. a blending unit including a blender container, a blending mechanism and a pivoting mechanism, wherein said blender container includes a receiving opening formed preferably at the top of said blender container, and wherein said pivoting mechanism facilitates pivotal motion of said blending unit;
    iv. an ice flakes intermixing mechanism for shuffling said ice flakes in an ice flakes container;
    v. a conveying mechanism for transferring said ice flakes from said ice flakes supplying unit to said blending unit; and
    vi. a mechanism for transferring said flavor ingredients to said blending unit,
  (b) selecting a flavored ice beverage;
  (c) pivoting said blending unit to a receiving state position, wherein at said receiving state position, said blending unit is in position to receive said flavor ingredients and said ice flakes;
  (d) transferring said flavor ingredients to said blending unit;
  (e) transferring said ice flakes to said blending unit;
  (f) pivoting said blending unit to a blending state position, wherein at said blending state position, said blending unit is preferably in an inclined position with respect to an upright position;
  (g) activation said blending mechanism for a predetermined time interval, thereby producing said ice beverage; and
  (h) delivering said ice beverage, wherein said ice beverage is a substantially homogeneous mixture;
  (i) activating said ice flakes intermixing mechanism to shuffle said ice flakes inside said ice flakes container, thereby maintain a substantially uniform mixture of ice flakes inside said ice flakes container.

25. The method of claim 24, wherein in said receiving state position, said blending unit is in an upwardly position.

26. The method of claim 24, wherein in said blending state position, said blending unit is substantially sealed.

27. The method of claim 24, wherein said receiving state position and said blending state position are at the same pivotal position.

28. The method of claim 24, wherein said provided apparatus for preparing and dispensing a flavored ice further includes a liquid supplier of a base liquid, preferably water, and a mechanism for transferring said base liquid to said blending unit, and said method further comprises the step of
  (i) transferring said base liquid, to said blending unit, said blending unit being at said receiving state position.

29. The method of claim 24, wherein said provided apparatus for preparing and dispensing a flavored ice further includes a vessel dispensing unit, and said method further comprises the step of:
  (j) dispensing a cup from said a vessel dispensing unit, before said delivering of said ice beverage.

30. The apparatus of claim 1 wherein the apparatus is configured to function as a payment-operated vending machine.

31. The method of claim 24, wherein said apparatus is payment-operated vending machine.

* * * * *